（12）United States Patent
Lee et al.

(10) Patent No.: US 11,835,623 B2
(45) Date of Patent: Dec. 5, 2023

(54) DEVICE AND METHOD FOR CONTROLLING VEHICLE AND RADAR SYSTEM FOR VEHICLE

(71) Applicant: HL KLEMOVE CORP., Incheon (KR)

(72) Inventors: Jingu Lee, Gyeonggi-do (KR); Han Byul Lee, Seoul (KR); Jung Hwan Choi, Gyeonggi-do (KR); Jae Hyun Han, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 397 days.

(21) Appl. No.: 17/246,594

(22) Filed: May 1, 2021

(65) Prior Publication Data

US 2021/0349207 A1   Nov. 11, 2021

(30) Foreign Application Priority Data

May 8, 2020 (KR) .................. 10-2020-0054930

(51) Int. Cl.
G01S 13/931 (2020.01)
G01S 13/58 (2006.01)
G01S 7/41 (2006.01)
G01S 7/288 (2006.01)

(52) U.S. Cl.
CPC .......... *G01S 13/931* (2013.01); *G01S 7/2883* (2021.05); *G01S 7/411* (2013.01); *G01S 13/588* (2013.01); *G01S 2013/9322* (2020.01)

(58) Field of Classification Search
CPC ...... G01S 13/931; G01S 7/2883; G01S 7/411; G01S 13/588; G01S 2013/9322
See application file for complete search history.

(56) References Cited

U.S. PATENT DOCUMENTS

| | | | | |
|---|---|---|---|---|
| 9,311,818 B2* | 4/2016 | Lin | ................. | G06T 7/337 |
| 9,475,422 B2* | 10/2016 | Hillis | ................. | B60Q 1/5037 |
| 10,303,257 B2* | 5/2019 | Hillis | ................. | B60Q 1/547 |
| 10,556,586 B2* | 2/2020 | Härslätt | ................. | G08G 1/167 |
| 11,693,106 B2* | 7/2023 | Lang | ................. | G01S 13/343 |
| | | | | 342/109 |
| 2014/0341434 A1* | 11/2014 | Lin | ................. | G06T 7/337 |
| | | | | 382/104 |
| 2015/0336502 A1* | 11/2015 | Hillis | ................. | B60Q 1/547 |
| | | | | 701/23 |
| 2017/0010679 A1* | 1/2017 | Hillis | ................. | B60Q 5/005 |
| 2018/0001889 A1* | 1/2018 | Härslätt | ................. | G08G 1/167 |
| 2019/0235635 A1* | 8/2019 | Hillis | ................. | G06T 13/80 |
| 2020/0150260 A1* | 5/2020 | Lang | ................. | G01S 7/415 |
| 2021/0162962 A1* | 6/2021 | Takaki | ................. | B60R 21/0134 |

* cited by examiner

*Primary Examiner* — Sisay Yacob
(74) *Attorney, Agent, or Firm* — Ladas & Parry, LLP (57) ABSTRACT

Various embodiments relate to a device and method for controlling vehicles and a radar system for vehicles. The vehicle controller may include a spectrum generator generating a 2D spectrum, a range-velocity map generator generating a range-velocity map corresponding to each height value included in a height set, a correlation coefficient determiner determining a correlation coefficient corresponding to each height value included in the height set, and a target determiner estimating a height of a target based on the correlation coefficient and recognizing the target based on the height of the target.

20 Claims, 10 Drawing Sheets

FIG. 5 velocity of vehicle
e.g. 100km/h height_set
e.g. {1m, 2m, 3m, ......, 19m, 20m} range_set
e.g. {10m, 20m, 30m, ......, 290m, 300m}

⇧

$d_k^{(n)} = \sqrt{(r_k^{(n)})^2 - (h_k^{(n)})^2}$, $\theta_k^{(n)} = tan^{-1}\left(\frac{h_k^{(n)}}{d_k^{(n)}}\right)$, $V_k^{(n)} = -v_{ego} \cdot cos\theta_k^{(n)}$

⇧

$MAP_{(n)}(r,v)$, $\begin{pmatrix} 0\,0\,0\,0\,0\,0 \ldots 0\,1\,1 \\ 0\,0\,0\,0\,0\,0 \ldots 0\,1\,0 \\ 0\,0\,0\,0\,0\,0 \ldots 1\,0\,0 \\ \vdots \\ 0\,0\,0\,1\,1\,1 \ldots 0\,0\,0 \\ 1\,1\,1\,0\,1\,0 \ldots 0\,0\,0 \\ 1\,1\,0\,0\,0\,0 \ldots 0\,0\,0 \end{pmatrix}$

$MAP_{(n)}(r, v),$ $$Y_{(n)} = \sum_{v=0}^{V-1} \sum_{r=0}^{R-1} S(r,v) \cdot MAP_{(n)}(r,v)$$

e.g. n = 20                                    e.g. n = 20

| | | | |
|---|---|---|---|
| $MAP(1)(r, v)$ | (for h=1m) | $y(1) = 0.05$ | (for h=1m) |
| $MAP(2)(r, v)$ | (for h=2m) | $y(2) = 0.01$ | (for h=2m) |
| $MAP(3)(r, v)$ | (for h=3m) | $y(3) = 0.3$ | (for h=3m) |
| ... | | ... | |
| $MAP(19)(r, v)$ | (for h=19m) | $y(19) = 0.5$ | (for h=19m) |
| $MAP(20)(r, v)$ | (for h=20m) | $y(20) = 0.02$ | (for h=20m) |

DEVICE AND METHOD FOR CONTROLLING VEHICLE AND RADAR SYSTEM FOR VEHICLE

CROSS-REFERENCE TO RELATED APPLICATION

This application claims priority from Korean Patent Application No. 10-2020-0054930, filed on May 8, 2020, which is hereby incorporated by reference for all purposes as if fully set forth herein.

BACKGROUND

Field

Various embodiments relate to a device and method for controlling vehicles and a radar system for vehicles.

Description of Related Art

Vehicles use radar to detect objects around the vehicle. In this case, the signal input through the radar may vary in various ways depending on the road environment in which the vehicle is traveling. Recently, there are increasing research and development efforts at technology capable of recognizing the road environment in which a vehicle is traveling based on the signal input through radar.

BRIEF SUMMARY

The embodiments may provide a vehicle controller and control method and vehicle radar system capable of recognizing the road environment in which a vehicle is traveling based on the signal input from radar.

The embodiments may provide a vehicle controller and control method and vehicle radar system capable of determining the height of a target using a radar signal.

According to an embodiment, there may be provided a device for controlling a vehicle, comprising a spectrum generator generating a two-dimensional (2D) spectrum including a range component and a velocity component based on a plurality of chirp signals received from a radar sensor, a range-velocity map generator generating a range-velocity map corresponding to each height value included in a height set based on the height set, the height set including a velocity of the vehicle and a plurality of height values, a correlation coefficient determiner determining a correlation coefficient corresponding to each height value included in the height set based on the 2D spectrum and the range-velocity map, and a target determiner estimating a height of a target based on the correlation coefficient for each height value included in the height set and recognizing the target based on a height of the target.

According to an embodiment, there may be provided a method for controlling a vehicle, comprising generating a two-dimensional (2D) spectrum including a range component and a velocity component based on a plurality of chirp signals received from a radar sensor, generating a range-velocity map corresponding to each height value included in a height set based on the height set, the height set including a velocity of the vehicle and a plurality of height values, determining a correlation coefficient corresponding to each height value included in the height set based on the 2D spectrum and the range-velocity map, and estimating a height of a target based on the correlation coefficient for each height value included in the height set and recognizing the target based on a height of the target.

According to an embodiment, there may be provided a radar system for a vehicle, comprising a radar sensor providing a plurality of chirp signals and a controller generating a two-dimensional (2D) spectrum including a range component and a velocity component based on the plurality of chirp signals provided from the radar sensor radar sensor, generating a range-velocity map corresponding to each height value included in a height set based on the height set, the height set including a velocity of the vehicle and a plurality of height values, determining a correlation coefficient corresponding to each height value included in the height set based on the 2D spectrum and the range-velocity map, and estimating a height of a target based on the correlation coefficient for each height value included in the height set and recognizing the target based on a height of the target.

According to the embodiments, there may be provided a vehicle controller and control method and vehicle radar system capable of recognizing the road environment in which a vehicle is traveling based on the signal input from radar.

According to the embodiments, there may be provided a vehicle controller and control method and vehicle radar system capable of determining the height of a target using a radar signal.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
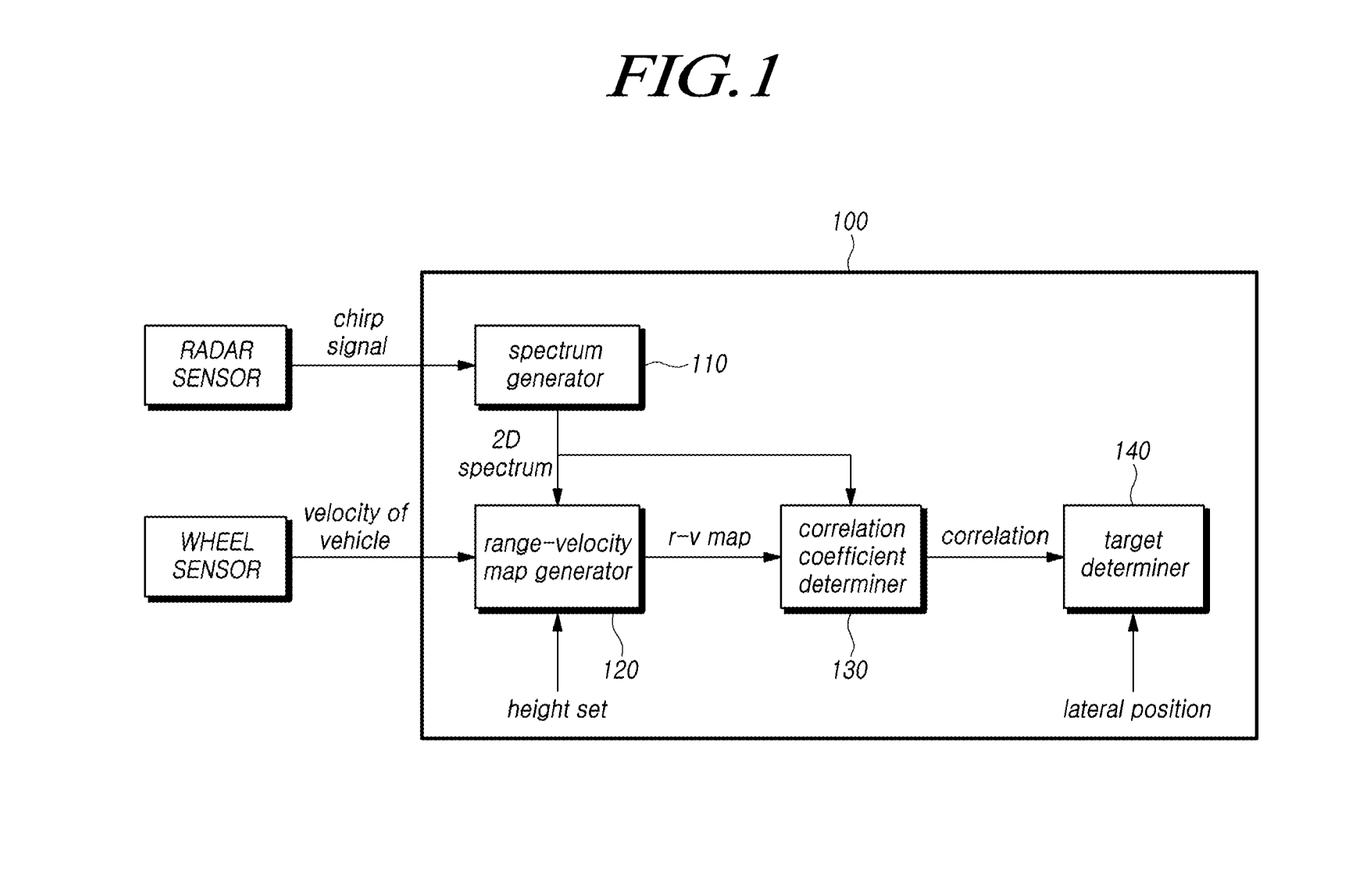
FIG. 1 is a block diagram illustrating a device for controlling a vehicle according to an embodiment.

FIG. 1 is a block diagram illustrating a configuration of a vehicle controller according to an embodiment.

Referring to FIG. 1, according to an embodiment, a radar system of a vehicle may include at least one of a radar sensor or a vehicle controller 110.

According to an embodiment, the radar system may include a radar sensor that provides a plurality of chirp signals and a controller that generates a 2D spectrum including a range component and a velocity component based on the plurality of chirp signals received from the radar sensor, generates a range-velocity map corresponding to each height value included in a height set including the velocity of the vehicle and a plurality of height values, based on the height set, determines a correlation coefficient corresponding to each height value included in the height set based on the 2D spectrum and the range-velocity map, estimates the height of a target based on the correlation coefficient for each height value included in the height set, and recognizes the target based on the height of the target. Here, the controller may mean a controller 110 of the vehicle.

Specifically, the radar sensor may be mounted on the vehicle. The radar sensor may transmit a signal and receive a signal reflected from the target. The radar sensor may process the signal reflected from the target and provide the result of the processing to the vehicle controller 100 (e.g., a spectrum generator). For example, the radar sensor may provide a chirp signal to the vehicle controller.

The vehicle controller 100 may include at least one of a spectrum generator 110, a range-velocity map generator 120, a correlation coefficient determiner 130, or a target determiner 140.

The spectrum generator 110 may generate a two-dimension (2D) spectrum including a range component and a velocity component based on a plurality of chirp signals received from the radar sensor.

Here, the 2D spectrum for the range component and the velocity component may be information indicating the existence of an object having a specific velocity (velocity relative to the vehicle) at a specific distance from the vehicle.

The range-velocity map generator 120 may generate a range-velocity map (r-v map) corresponding to each height value included in a height set including the velocity of vehicle and a plurality of height values, based on the height set.

The range-velocity map for the height value may be information indicating the possibility of presence of an object having a specific velocity at a specific distance from the vehicle when a target (e.g., a stationary structure) exists at the height value.

The velocity of vehicle may be determined based on a signal from a wheel sensor.

The plurality of height values included in the height set may be preset values or, without limitations thereto, may be values that vary depending on ambient environment information (e.g., temperature/weather/location of vehicle).

The correlation coefficient determiner 130 may determine the correlation coefficient corresponding to each height value included in the height set, based on the range-velocity map generated by the range-velocity map generator 120 and the 2D spectrum generated by the spectrum generator 110.

The correlation coefficient corresponding to the height value may be information indicating information for the target (e.g., the presence or absence of the target/the material of the target) located at the height corresponding to the height value.

The target determiner 140 may estimate the height of the target based on the correlation coefficient for each height value included in the height set and recognize the target based on the height of the target.

In other words, the target determiner 140 may recognize the environment in which the target is in, based on the correlation coefficient for each height value included in the height set, determine the height of the target in the recognized environment, and recognize the target based on the height of the target.

In other words, the target determiner 140 may compare the correlation coefficient for each height value included in the height set with at least one threshold coefficient value, recognizes the environment which the target is in according to the result of the comparison, determine that a height of the target, which is equal to or larger than the threshold coefficient value, is the height of the target present in the recognized environment and store the height of the target, compare the height of the target present in the recognized environment with at least one threshold difference value, and recognize the target according to the result of the comparison.

There may be a plurality of heights of target which are equal to or larger than the threshold coefficient value but, without limitations thereto, there may be only one height of target (e.g., a first height value). For example, if there are a plurality of heights of target which are equal to or larger than the threshold coefficient value, the controller may determine that the one with the highest correlation coefficient among the heights of target equal to or larger than the threshold coefficient value is the height of the target present in the recognized environment.

For example, the target determiner 140 may determine whether there is the target and the material of the target based on the correlation coefficient determined by the correlation coefficient determiner 130. The target determiner 140 may recognize the environment which the target is in, based on the result of determination of whether there is the target and the material of the target and determine the height of the target present in the recognized environment.

Specifically, for a first height value among the height values included in the height set, the target determiner 140 may determine whether there is the target located at the first height value and the material of the target based on the correlation coefficient corresponding to the first height value. The target determiner 140 may determine the height of the target based on whether there is the target for the height value included in the height set.

The target determiner 140 may determine the structure of the target based on lateral position information for the target and the height of the target. The target determiner 140 may recognize the target based on the result of determination of the structure of the target.

The lateral position value of the target may be a value determined via a signal from the radar sensor or may be information gathered via a separate sensor from the radar sensor.

As such, according to an embodiment, the vehicle controller 100 may determine whether there is the target, the material of the target, the height of the target, and the structure of the target, recognize the road environment in which the vehicle is traveling based thereupon, and control the operation of the vehicle based thereupon.

Each of the spectrum generator 110, range-velocity map generator 120, correlation coefficient determiner 130, and target determiner 140 included in the vehicle controller 100 may be implemented as a separate circuit device. Alternatively, the vehicle controller 100 may execute (drive) firmware programmed to perform the overall operation of the spectrum generator 110, the range-velocity map generator 120, the correlation coefficient determiner 130, and the target determiner 140.

Figure 2:
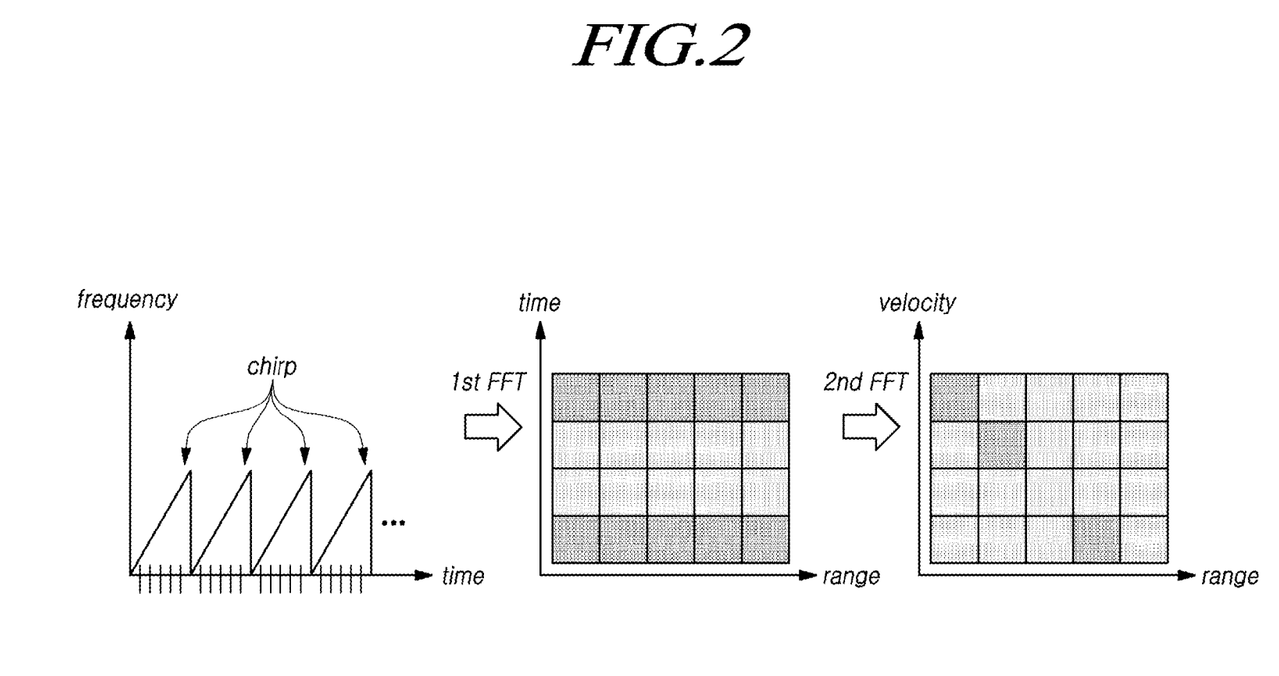
FIG. 2 is a view illustrating a method for generating a 2D spectrum according to an embodiment.

FIG. 2 is a view illustrating a method for generating a 2D spectrum according to an embodiment.

Referring to FIG. 2, according to an embodiment, the spectrum generator 110 may obtain a range component of a 2D spectrum by executing a primary fast Fourier transform (FFT) on each chirp signal (or in the chirp signal) received from the radar sensor and obtain a velocity component of the 2D spectrum by executing a secondary FFT between the chirp signal (or on all of the chirp signals) in the result of execution of the primary FFT, thereby generating the 2D spectrum including the range component and the velocity component.

Specifically, the spectrum generator 110 may receive a plurality of chirp signals from the radar sensor. For example, the spectrum generator 110 may simultaneously receive 128 or 256 chirp signals from the radar sensor.

Thereafter, the spectrum generator 110 may determine range component values and velocity component values for the plurality of chirp signals by performing a 2D FFT on the plurality of chirp signals received from the radar sensor.

In other words, the spectrum generator 110 may measure a plurality of sample values for each chirp signal by performing sampling on each chirp signal multiple times. The multiple times of sampling may include 512 times of sampling, but embodiments of the disclosure are not limited thereto.

The spectrum generator 110 may extract signal component values according to distances by executing the primary FFT on the sample values for each chirp signal. In other words, the spectrum generator 110 may extract signal component values according to distances at a specific time via the primary FFT.

Here, the primary FFT may be performed for a fast time.

Here, the primary FFT may be referred to as a range FFT.

The spectrum generator 110 may extract the velocity component values by compressing the signal component values according to distances via the secondary FFT on all the chirp signals. In other words, the spectrum generator 110 may extract the velocity component value by compressing the signal present at each distance according to the velocity via the secondary FFT between the chirp signals in the result of execution of the primary FFT.

Here, the secondary FFT may be performed for a slow time.

Here, the secondary order FFT may be referred to as a Doppler FFT.

Thereafter, the spectrum generator 110 may generate a 2D spectrum including the range component and the velocity component using the determined range component value and the velocity component value. The 2D spectrum $S(r,v)$ generated by the above-described method may indicate whether there is an object corresponding to the range r and the velocity v. For example, as there is more likely an object whose velocity relative to the vehicle is v in the range r from the vehicle, the value of $(r,v)$ on the 2D spectrum may be higher.

Figure 3:
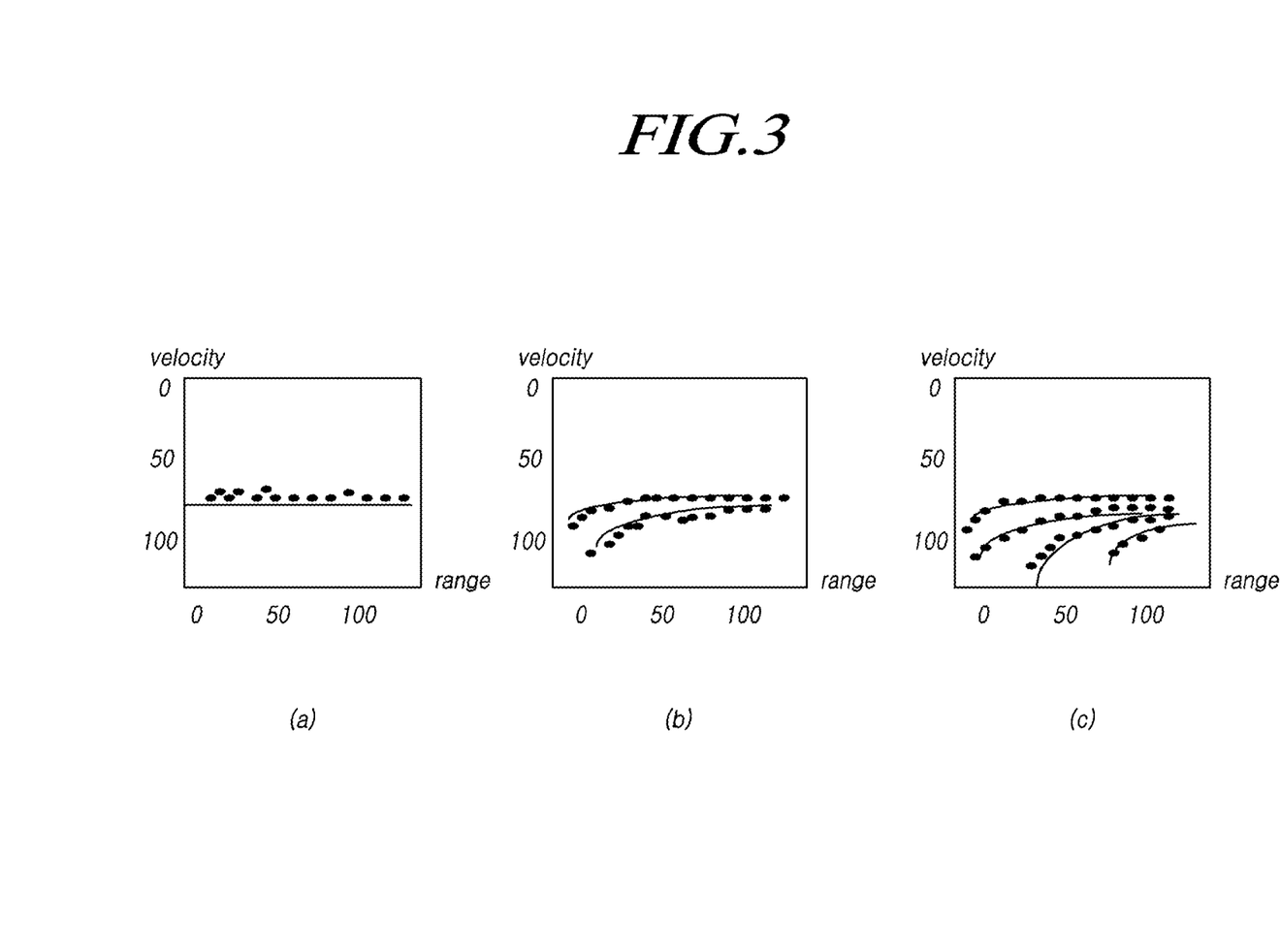
FIG. 3 is a view illustrating a road environment generated via a 2D spectrum according to an embodiment.

FIG. 3 is a view illustrating a road environment generated via a 2D spectrum according to an embodiment.

A vehicle equipped with a radar may obtain signals from other vehicles in front, as well as signals from various stationary structures (e.g., guard rails or tunnels) located around the road on which the vehicle is traveling, through the radar while driving. Accordingly, the 2D spectrum generated by the spectrum generator 110 according to an embodiment may be varied by the road environment (e.g., various stationary structures on the road) where the vehicle is traveling, as well as other vehicles. Referring to FIG. 3(*a*), signals having a pattern in which they have different range component values but similar velocity component values may be distributed on the 2D spectrum. This may mean that a stationary structure is positioned at a similar height to the vehicle, in front of the vehicle. This may be because the signal reflected from the stationary structure has a constant velocity (whose direction is opposite to the velocity of the vehicle) regardless of the distance to the vehicle.

Here, the stationary structure may be a guard rail (e.g., a left-side guard rail).

Referring to FIG. 3(*b*), signals having a pattern in which the velocity component value increases as the range component value increases and then converges to a specific value may be distributed on the 2D spectrum. This may mean that a stationary structure is positioned higher than the vehicle, in front of the vehicle. Here, there may be two patterns, meaning that there are two types of stationary structures. In this case, the two stationary structures may include a wall (e.g., a left-side wall structure) and an upper structure.

Referring to FIG. 3(c), signals having a pattern in which the velocity component value increases as the range component value increases and then converges to a specific value may be distributed on the 2D spectrum. This may mean that a stationary structure is positioned higher than the vehicle, in front of the vehicle. Here, there may be a plurality of patterns, meaning that there are a plurality of types of stationary structures. In this case, the plurality of stationary structures may include a left-side structure (e.g., a left-side steel structure), a right-side structure (e.g., a right-side steel structure), and an upper structure (e.g., an upper steel structure).

As described above, the pattern of the signal generated by the stationary structure may vary depending on the height of the stationary structure. This may be because the degree of variation in the angle of propagation reflected by the radar according to the distance to the vehicle varies depending on the height of the stationary structure.

Figure 4:
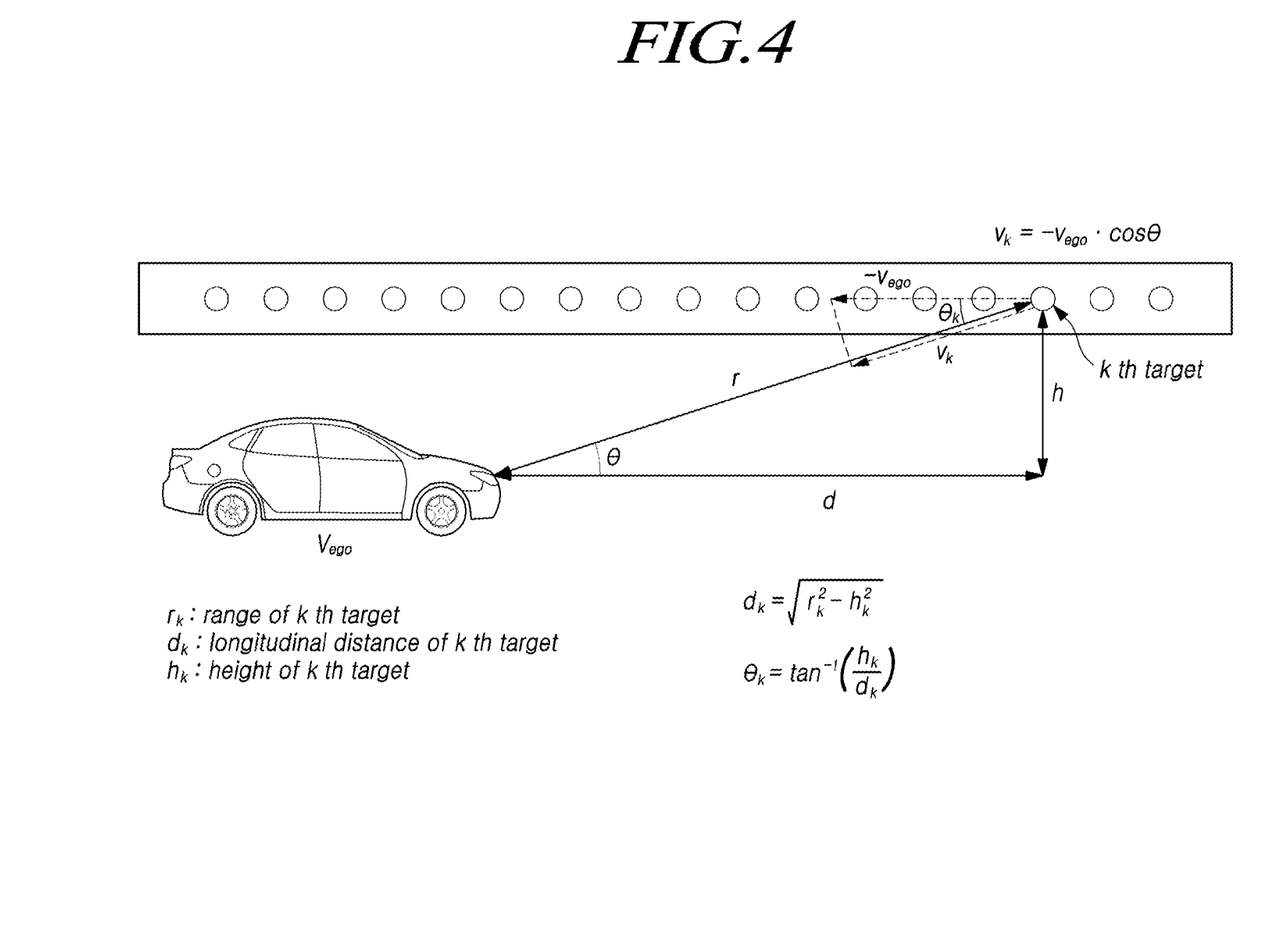
FIG. 4 is a view illustrating a method for determining a velocity for a target according to an embodiment.

FIG. 4 is a view illustrating a method for determining a velocity for a target according to an embodiment.

In other words, FIG. 4 illustrates a method for determining the velocity $v_k$ of the kth (k is a natural number) target on the stationary structure positioned at height h from the vehicle. In this case, $v_k$ may be the velocity in the direction in which the vehicle travels, that is, in the longitudinal direction of the vehicle.

Referring to FIG. 4, the range between the kth target and the vehicle, the height of the kth target (with respect to the vehicle), and the velocity of the vehicle may be defined as $r_k$, $h_k$, and $v_{ego}$, respectively.

In this case, the distance $d_k$ in the longitudinal direction between the kth target and the vehicle may be determined as follows according to the Pythagorean theorem.

$$d_k = \sqrt{r_k^2 - h_k^2}$$

The angle in $\theta_k$ the vertical direction between the kth target and the vehicle may be determined as follows:

$$\theta_k = \tan^{-1}\left(\frac{h_k}{d_k}\right)$$

In this case, the velocity $v_k$ in the longitudinal direction of the vehicle of the kth target (with respect to the vehicle) may be determined as follows.

$$v_k = -v_{ego} \cdot \cos\theta_k$$

When $0 \leq \theta \leq \pi/2$ for angle $\theta$, $\cos\theta$ may decrease as $\theta$ increases. Therefore, as the angle $\theta_k$ in the vertical direction between the target and the vehicle increases, $\cos\theta_k$ decreases, so that $v_k$ (absolute value) may reduce. Therefore, as the target is positioned closer to the vehicle on the stationary structure, the angle in the vertical direction between the target and the vehicle increases. Therefore, as the target has the smaller $v_k$ and is farther away from the vehicle, the angle in the vertical direction between the target and the vehicle gradually increases, so that $v_k$ may increase. Meanwhile, since $\cos(0)=1$, $v_k$ may converge to $-v_{ego}$.

If the height of the stationary structure is varied, the patter in which $\theta_k$ varies is altered, so that the pattern in which the velocity $v_k$ of the kth target on the stationary structure may be changed. In other words, depending on the number of stationary structures positioned at different heights, the number of patterns in which the velocity varies depending on the distance on the 2D spectrum may vary.

Figure 5:
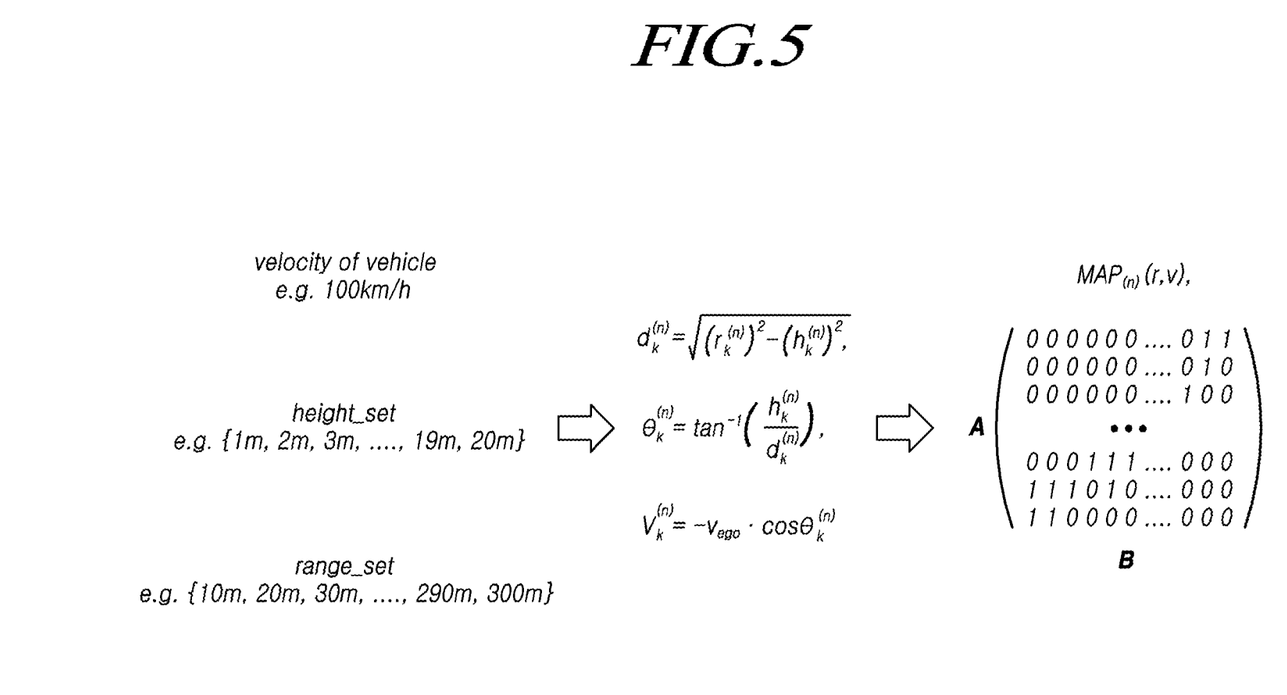
FIG. 5 is a view illustrating a method for generating a range-velocity map according to an embodiment.

FIG. 5 is a view illustrating a method for generating a range-velocity map according to an embodiment.

According to an embodiment, after configuring a height set including a plurality of height values, the height of a stationary structure located in front of the vehicle may be estimated using a range-velocity map corresponding to each height value included in the height set.

In other words, according to an embodiment, the range-velocity map generator 120 may create a table (or height set) under the assumption that the height value corresponding to the height of the structure is an arbitrary value, determines the velocity of the target according to each height set based on the velocity of the vehicle, and generate a range-velocity map having a size of 1 based on the velocity of the target and the distance to the target.

As an example, the range-velocity map generator 120 may determine a range-velocity map corresponding to each height value included in the height set based on the height set including the velocity of vehicle and a plurality of height values and a range set including a plurality of range values.

As another example, the range-velocity map generator 120 may determine the range-velocity map corresponding to each height value included in the height set based on the height set including the velocity of vehicle and a plurality of height values and the range component included in the 2D spectrum.

Typically, vehicles may not measure (or determine) the height of a stationary structure using radar signals. According to an embodiment, the vehicle controller may indirectly estimate the height of the stationary structure using the height set along with radar signals and recognize the road environment, thereby enhancing the capability of detection and road environment recognition of the radar sensor.

Referring to FIG. 5, the height set may include 20 height values {1 m, 2 m, 3 m, . . . , 19 m, 20 m}, as illustrated, but is not limited thereto. The number of height values and the size of each height value may be modified.

The velocity of vehicle $v_{ego}$ may include 100 km/h as illustrated in FIG. 5, but is not limited thereto and may be modified.

The range set including a plurality of range values may include {10 m, 20 m, 30 m, . . . , 290 m, 300 m}, as illustrated, but is not limited thereto, and the number of range values and the size of each range value may be modified.

The range-velocity map generator 120 may obtain the range-velocity map for the nth height value h included in the height set as follows.

For the range set {10 m, 20 m, 30 m, . . . , 290 m, 300 m} used to determine the range-velocity map for the nth height value, the height value for the target position at the kth range value $r_k^{(n)}$ included in the range set may be assumed to be $h_k^{(n)}$. In this case, for all of the range values included in the range set, $h_k^{(n)}$ may be the nth height value, h, included in the height set.

In this case, the distance $d_k^{(n)}$ in the longitudinal direction between the vehicle and the target may be determined as follows, as described above in connection with FIG. 4.

$$d_k^{(n)} = \sqrt{(r_k^{(n)})^2 - (h_k^{(n)})^2},$$

The angle $\theta_k^{(n)}$ in the vertical direction between the target and the vehicle may be determined as follows, as described above in connection with FIG. 4.

$$\theta_k^{(n)} = \tan^{-1}\left(\frac{h_k^{(n)}}{d_k^{(n)}}\right),$$

The velocity $v_k^{(n)}$ of the target (relative to the vehicle) may be determined as follows, as described above in connection with FIG. 4.

$$v_k = --v_{ego} \cdot \cos\theta_k \qquad 5$$

In other words, if the nth height value h included in the height set is determined, the velocity $v_k^{(n)}$ of the target corresponding to the range $r_k^{(n)}$ of the target may be determined. Therefore, for the nth height value included in the height set, a range-velocity map $MAP_{(n)}(r,v)$ representing the mapping relationship between the range of the target and the velocity of the target may be determined.

In this case, the range-velocity map $MAP_{(n)}(r,v)$, corresponding to the nth height value included in the height set may be a matrix composed of A rows and B columns. The number A of rows may be the number of set velocity sections, and the number B of columns may be the number of set range sections (the number of range values included in the range set).

The value of row i and column j ($1<=i<=A$, $1<=j<=B$) in the range-velocity map $MAP_{(n)}(r,v)$ corresponding to the nth height value in the height set may be 0 or 1.

Here, the value of row i and column j being 0 may mean that the chance for the signal generated by a stationary structure positioned at the height of the nth height value h to indicate the (range, velocity) value corresponding to row i and column j from the vehicle is smaller than a preset threshold (e.g., 10%).

Here, the value of row i and column j being 1 may mean that the chance for the signal generated by a stationary structure positioned at the height of the nth height value to indicate the (range, velocity) value corresponding to row i and column j from the vehicle is larger than a preset threshold (e.g., 90%).

According to an embodiment, the value positioned in the row corresponding to $v_k^{(n)}$ among the column values for which the range value corresponds to $r_k^{(n)}$ in $MAP_{(n)}(r,v)$, may be determined to be 1 (if the range is $r_k^{(n)}$, the velocity is highly likely to be $v_k^{(n)}$), and the other values may be determined to be 0's.

Figure 6:
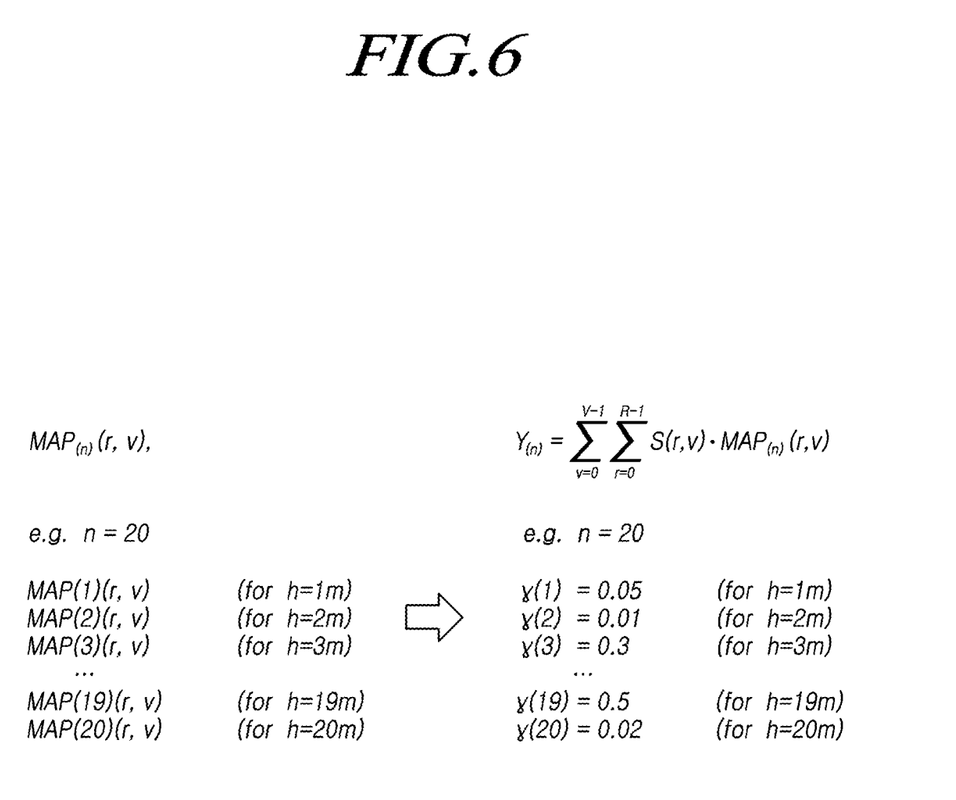
FIG. 6 is a view illustrating a method for determining a correlation coefficient according to an embodiment.

FIG. 6 is a view illustrating a method for determining a correlation coefficient according to an embodiment.

Referring to FIG. 6, according to an embodiment, the correlation coefficient determiner 130 may determine the correlation coefficient corresponding to each height value included in the height set using the determined range-velocity map and the above-described 2D spectrum.

Specifically, the range-velocity map may be determined corresponding to each height value included in the height set but, without limitations thereto, may be modified.

For example, 20 range-velocity maps may be determined which individually correspond to the 20 height values {1 m, 2 m, 3 m, . . . , 19 m, 20 m} included in the height set.

Here, the 20 range-velocity maps may include MAP(1)(r,v) (range-velocity map corresponding to a height value of 1 m), MAP(2)(r,v) (range-velocity corresponding to a height value of 2 m), MAP(3)(r,v) (range-velocity map corresponding to a height value of 3 m), . . . , MAP(19)(r,v) (range-velocity map corresponding to a height value of 19 m), and MAP(20)(r,v) (range-velocity map corresponding to a height value of 20 m).

In this case, the correlation coefficient $\gamma_{(n)}$ for the range-velocity map $MAP_{(n)}(r,v)$, corresponding to the nth height value included in the height set and the 2D spectrum S(r,v) may be determined as follows.

$$\gamma(n) = \sum_{v=0}^{V-1} \sum_{r=0}^{R-1} S(r,v) \cdot MAP_{(n)}(r,v)$$

Here, V may be the number of velocity sections in $MAP_{(n)}(r,v)$, and R may be the number of range sections in $MAP_{(n)}(r,v)$.

The correlation coefficient determiner 130 may determine 20 correlation coefficients $\gamma(1)$, $\gamma(2)$, $\gamma(3)$, . . . , $\gamma(19)$, $\gamma(20)$ based on the 2D spectrum S(r,v) and the 20 range-velocity maps MAP(1)(r,v), MAP(2)(r,v), MAP(3)(r,v), . . . , MAP(19)(r,v), MAP(20)(r,v).

Here, the correlation coefficient $\gamma_{(n)}$ for the nth height value included in the height set may be information indicating whether the 2D spectrum generated via the signal received from the radar sensor indicates information for the object (stationary structure) positioned at the height of the nth height value.

For example, if $\gamma(1)=0.05$, $\gamma(2)=0.01$, $\gamma(3)=0.3$, . . . , $\gamma(19)=0.5$, and $\gamma(20)=0.02$ as illustrated, $\gamma(3)$ and $\gamma(19)$ are greater than $\gamma(1)$, $\gamma(2)$, and $\gamma(20)$ and, thus, the chance that an object (stationary structure) is positioned at a height of 3 m or 19 m may be higher than the chance that an object is positioned at a height of 1 m, 2 m, or 20 m.

According to an embodiment, the target determiner 140 may determine what target is positioned at a specific height value based on the correlation coefficient determined by the correlation coefficient determiner 130.

Figure 7:
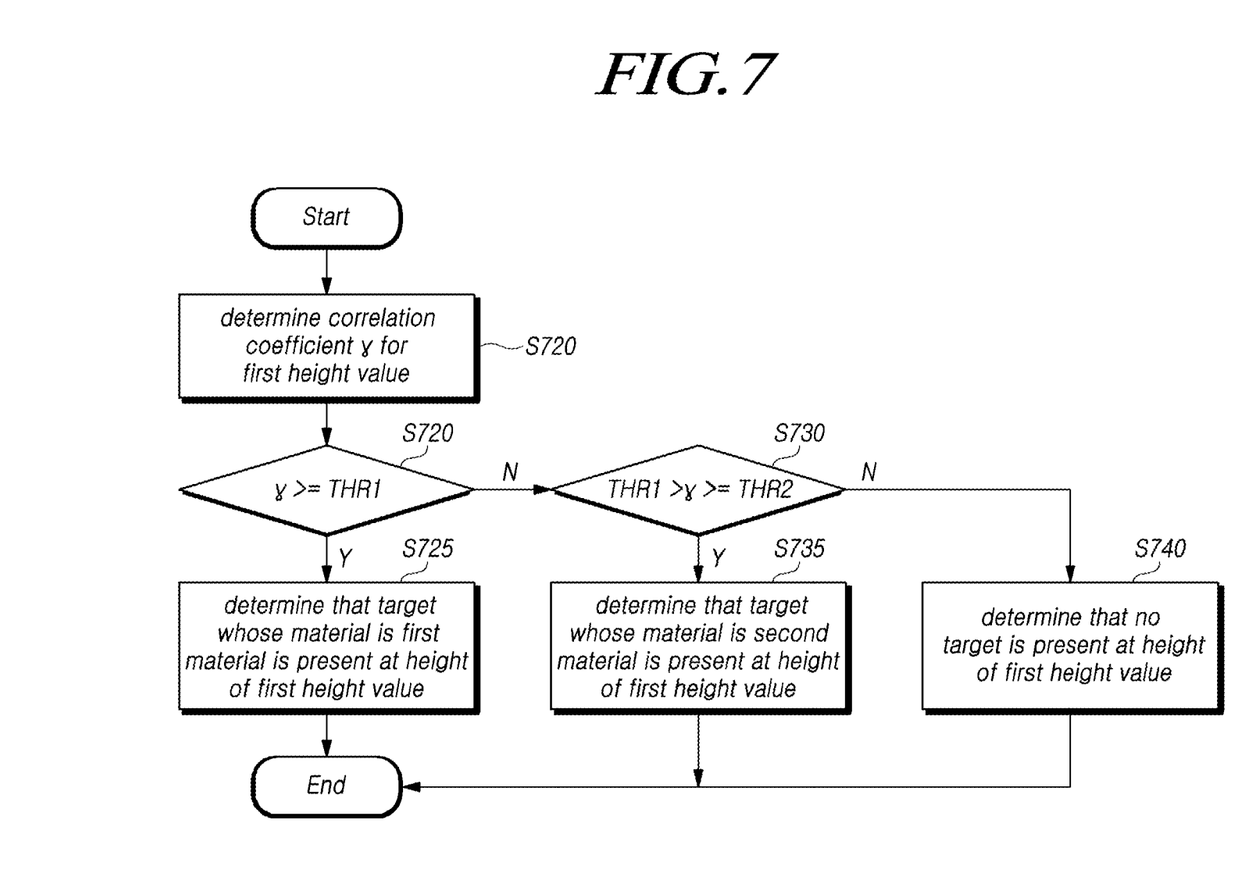
FIG. 7 is a flowchart illustrating a method for determining whether there is a target and determining a material of the target according to an embodiment.

FIG. 7 is a flowchart illustrating a method for determining whether there is a target and determining a material of the target according to an embodiment. Referring to FIG. 7, the correlation coefficient determiner 130 may determine the correlation coefficient $\gamma$ for a first height value among a plurality of height values included in a height set as described above in connection with FIG. 6 (S710).

Then, the target determiner 140 may determine whether the correlation coefficient $\gamma$ determined in step S710 is equal to or larger than a first threshold coefficient THR1 (S720).

If the correlation coefficient $\gamma$ is equal to or larger than the first threshold coefficient THR1 (S720-Y), the target determiner 140 may determine that a target, whose material is a first material, exists at a height of the first height value (S725).

Here, the correlation coefficient $\gamma$ for the first height value being high may mean that a strong signal is reflected from an object (stationary structure) positioned at the height of the first height value. Accordingly, the target determiner 140 may determine that the target exists at the height of the first height value. Further, the target determiner 140 may determine that the target has a material that strongly reflects the signal generated from the radar.

In this case, the first material may include iron. Accordingly, the target determiner 140 may determine that a target formed of iron (e.g., an iron beam) exists at the height of the first height value.

In contrast, if the correlation coefficient $\gamma$ is less than the first threshold coefficient THR1 (S720-N), the target determiner 140 may determine whether the correlation coefficient $\gamma$ is less than the first threshold coefficient value THR1 and equal to or larger than a second threshold coefficient THR2 (S730). In this case, the second threshold coefficient THR2 may be smaller than the first threshold coefficient THR1.

If the correlation coefficient $\gamma$ is less than the first threshold coefficient THR1 and equal to or larger than the second threshold coefficient THR2 (S730-Y), the target determiner

140 may determine that a target, whose material is a second material, exists at a height of the first height value (S735).

In this case, the second material may be different from the first material. In this case, the target determiner 140 may determine that the target exists at the height of the first height value. However, the target determiner 140 may determine that the target is a material that reflects the signal generated from the radar weakly as compared with the first material.

Here, the second material may include cement. In this case, the target determiner 140 may determine that a target formed of cement (e.g., a cement wall) exists at the height of the first height value.

In contrast, if the correlation coefficient $\gamma$ is less than the second threshold coefficient THR2 (S730-Y), the target determiner 140 may determine that no target exists at the height of the first height value (S740).

Meanwhile, if the target determiner 140 determines that a target exists, the target determiner 140 may further determine the structure of the target.

Figure 8:
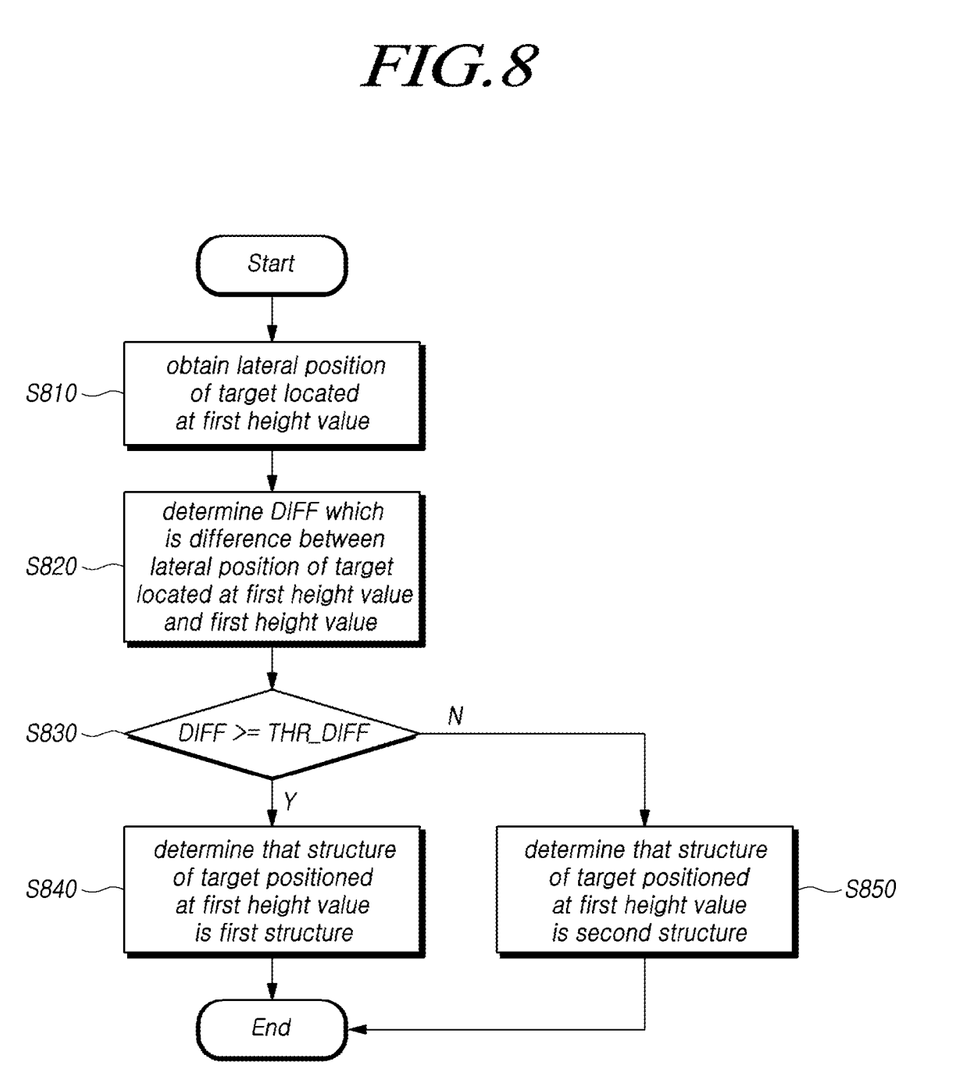
FIG. 8 is a view illustrating a method for determining a structure of a target according to an embodiment.

FIG. 8 is a view illustrating a method for determining a structure of a target according to an embodiment.

Referring to FIG. 8, the target determiner 140 may obtain a lateral position of a target located at a first height value (S810).

Here, the lateral position of the target may be a value determined from a signal from the radar sensor or a value received from another external sensor.

Thereafter, the target determiner 140 may determine DIFF, which is a difference between the lateral position of the target located at the first height value and the first height value (S820).

Then, the target determiner 140 may determine whether DIFF determined in step S820 is larger than or equal to a preset threshold difference THR_DIFF (S830).

If DIFF is larger than or equal to THR_DIFF (S830-Y), the target determiner 140 may determine that the structure of the target located at the first height value is a first structure (S840).

For example, the first structure may include a tunnel structure. In other words, if the first height value is larger than the lateral position of the target by THR_DIFF or more, the target determiner 140 may determine that the target exists at a high position from the center of the vehicle, and thus determine that the structure of the target is a tunnel structure.

If DIFF is less than THR_DIFF (S830-N), the target determiner 140 may determine that the structure of the target located at the first height value is a second structure different from the first structure (S850).

For example, the second structure may include a non-tunnel (e.g., guard rail) structure rather than a tunnel structure. Thus, unless the first height value is larger than the lateral position of the target by THR_DIFF or more, the target determiner 140 may determine that the target exists at a low position from the left or right side of the vehicle, and thus determine that the structure of the target is a non-tunnel structure.

Figure 9:
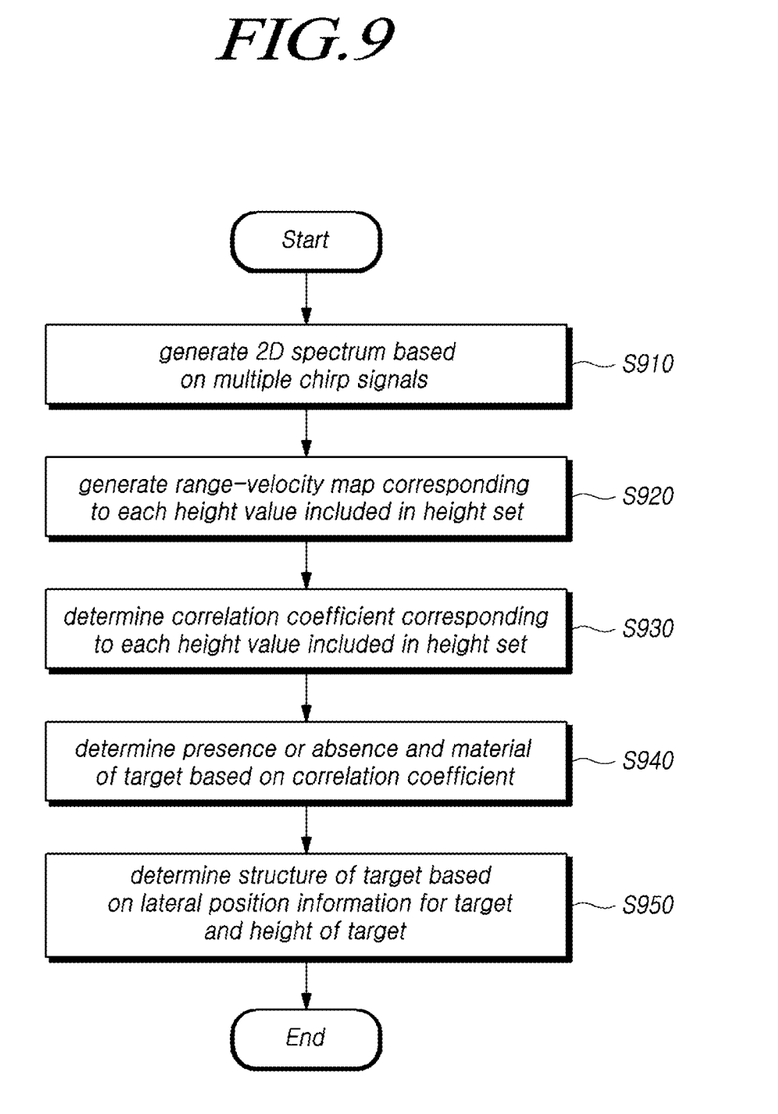
FIG. 9 is a flowchart illustrating a method for controlling a vehicle according to an embodiment.

FIG. 9 is a flowchart illustrating a method for controlling a vehicle according to an embodiment.

According to an embodiment, a method for controlling a vehicle may be executed by the above-described vehicle controller and the vehicle radar system.

Referring to FIG. 9, according to an embodiment, the method for controlling a vehicle may include at least one of generating a 2D spectrum, generating a range-velocity map, determining a correlation coefficient, or recognizing a target.

Recognizing a target may include at least one of determining whether there is a target and the material of the target and determining the structure of the target.

Specifically, a 2D spectrum including a range component and a velocity component may be generated based on a plurality of chirp signals received from the radar sensor (S910). Step S910 may be performed by the spectrum generator 110 included in the vehicle controller 100.

Thereafter, a range-velocity map corresponding to each height value included in a height set including the velocity of vehicle and a plurality of height values may be generated based on the height set (S920). Step S920 may be performed by the range-velocity map generator 120 included in the vehicle controller 100.

Thereafter, a correlation coefficient corresponding to each height value included in the height set may be determined based on the 2D spectrum generated in step S910 and the range-velocity map generated in operation S920 (S930). Step S930 may be performed by the correlation coefficient determiner 130 included in the vehicle controller 100.

Then, the height of the target may be estimated based on the correlation coefficient for each height value included in the height set, and the target may be recognized based on the height of the target.

In other words, the environment in which the target is in may be recognized based on the correlation coefficient for each height value included in the height set, the height of the target in the recognized environment may be determined, and the target may be recognized based on the height of the target.

For example, whether there is a target and the material of the target may be determined based on the correlation coefficient determined in step S930 (S940). Step S940 may be performed by the target determiner 140 included in the vehicle controller 100.

In step S940, if the correlation coefficient for the first height value determined in step S930, among the plurality of height values included in the height set is equal to or larger than the first threshold coefficient, it may be determined that a target whose material is a first material is positioned at the height of the first height value.

In step S940, if the correlation coefficient for the first height value is the first threshold coefficient or less and is not less than the second threshold coefficient (where the second threshold coefficient is smaller than the first threshold coefficient), it may be determined that a target whose material is a second material (where the second material differs from the first material) is positioned at the height of the first height value.

Thereafter, the structure of the target may be determined based on the height of the target determined to exist in step S940 and the lateral position information for the target (S950). Step S950 may be performed by the target determiner 140 included in the vehicle controller 100.

In step S950, it may be determined whether the structure of the target positioned at the first height value among the plurality of height values included in the height set is a first structure based on the lateral position of the target located at the first height value.

Figure 10:
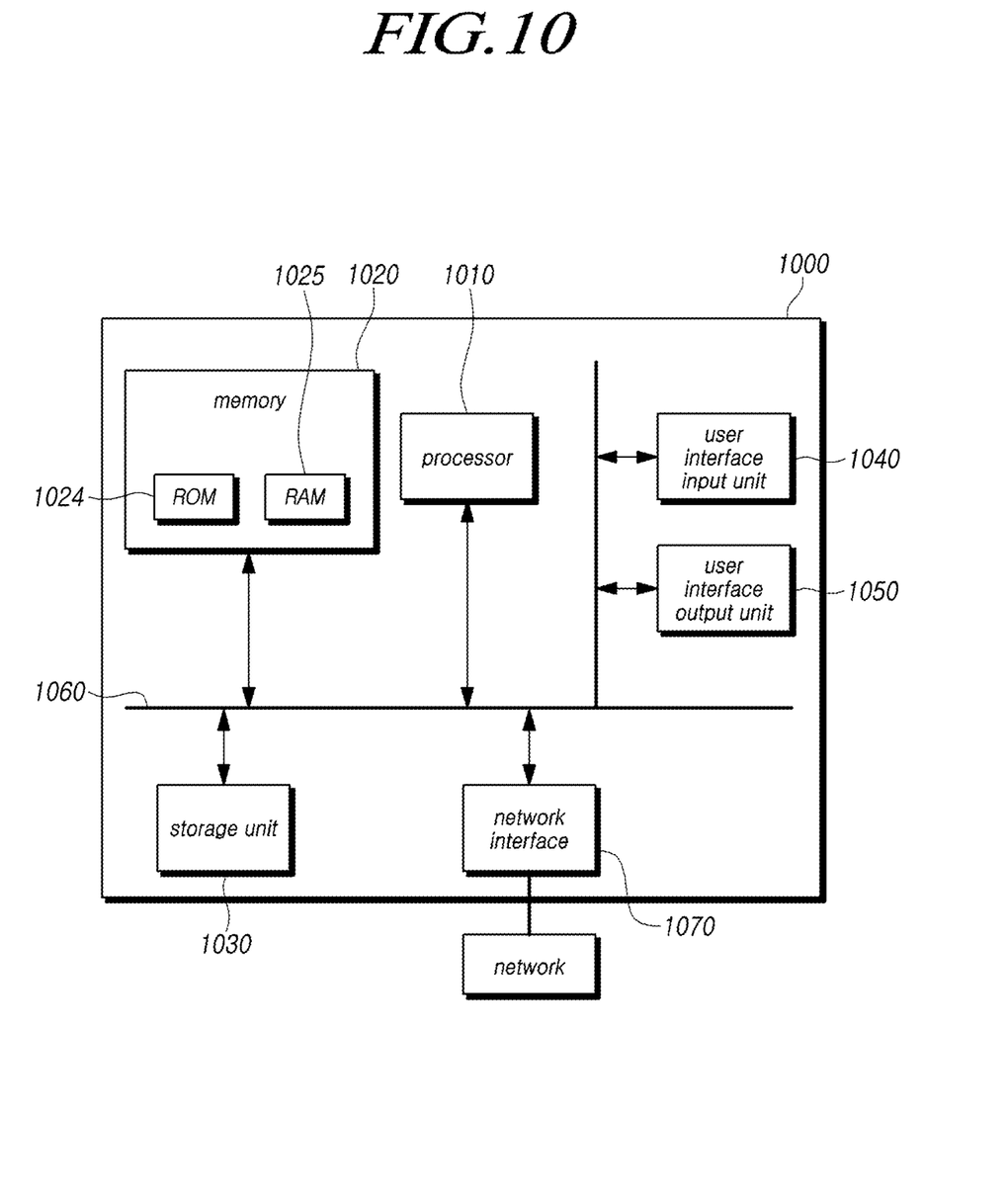
FIG. 10 is a block diagram illustrating a configuration of a computer system of a vehicle controller according to an embodiment.

FIG. 10 is a block diagram illustrating a configuration of a computer system of a vehicle controller and vehicle radar system according to an embodiment.

Referring to FIG. 10, the above-described embodiments may be implemented as, e.g., a computer-readable recording medium, in a computer system. As illustrated in the drawings, the computer system 1000 of the vehicle controller and vehicle radar system may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as a non-volatile computer recording medium storing computer-implemented methods or computer executable instructions. The instructions may be executed by the processor to perform a method according to an embodiment of the disclosure.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A device for controlling a vehicle, comprising:
   a spectrum generator generating a two-dimensional (2D) spectrum including a range component and a velocity component based on a plurality of chirp signals received from a radar sensor;
   a range-velocity map generator generating a range-velocity map corresponding to each height value included in a height set based on the height set, the height set including a velocity of the vehicle and a plurality of height values;
   a correlation coefficient determiner determining a correlation coefficient corresponding to each height value included in the height set based on the 2D spectrum and the range-velocity map; and
   a target determiner estimating a height of a target based on the correlation coefficient for each height value included in the height set and recognizing the target based on a height of the target.

2. The device of claim 1, wherein the spectrum generator obtains the range component of the 2D spectrum by executing a primary fast Fourier transform (FFT) on each of the chirp signals received from the radar sensor and obtains the velocity component of the 2D spectrum by executing a secondary FFT between the chirp signals in a result of the primary FFT to thereby generate the 2D spectrum.

3. The device of claim 1, wherein the range-velocity map generator determines the range-velocity map corresponding to each height value included in the height set based on the height set including the velocity of the vehicle and the plurality of height values and a range set including a plurality of range values, and wherein
   the velocity of the vehicle is determined based on a signal from a wheel sensor of the vehicle.

4. The device of claim 1, wherein the target determiner recognizes an environment in which the target is present based on the correlation coefficient for each height value included in the height set, determines the height of the target present in the recognized environment, and recognizes the target based on the height of the target.

5. The device of claim 1, wherein the target determiner determines whether the target is present and a material of the target based on the correlation coefficient for each height value included in the height set and determines a structure of the target based on the height of the target and lateral position information for the target.

6. The device of claim 5, wherein the target determiner determines that the target whose material is a first material is present at a height of a first height value among the plurality of height values included in the height set if the correlation coefficient for the first height value is a first threshold coefficient or more.

7. The device of claim 6, wherein the target determiner determines that the target whose material is a second material different from the first material is present at the height of the first height value if the correlation coefficient for the first height value is the first threshold coefficient or less and not less than a second threshold coefficient smaller than the first threshold coefficient.

8. The device of claim 6, wherein the first material includes iron.

9. The device of claim 5, wherein the target determiner determines whether the structure of the target positioned at the first height value is a first structure based on a lateral position of the target located at a first height value among the height values included in the height set.

10. The device of claim 9, wherein the first structure includes a tunnel structure.

11. A method for controlling a vehicle, the method comprising:
    generating a two-dimensional (2D) spectrum including a range component and a velocity component based on a plurality of chirp signals received from a radar sensor;
    generating a range-velocity map corresponding to each height value included in a height set based on the height set, the height set including a velocity of the vehicle and a plurality of height values;
    determining a correlation coefficient corresponding to each height value included in the height set based on the 2D spectrum and the range-velocity map; and
    estimating a height of a target based on the correlation coefficient for each height value included in the height set and recognizing the target based on a height of the target.

12. The method of claim 11, wherein recognizing the target based on the height of the target includes determining whether the target is present and a material of the target based on the correlation coefficient for each height value included in the height set, and wherein determining whether the target is present and the material of the target includes determining that the target whose material is a first material is present at a height of a first height value among the plurality of height values included in the height set if the correlation coefficient for the first height value is a first threshold coefficient or more.

13. The method of claim 12, wherein determining whether the target is present and the material of the target includes determining that the target whose material is a second material different from the first material is present at the height of the first height value if the correlation coefficient for the first height value is the first threshold coefficient or less and not less than a second threshold coefficient smaller than the first threshold coefficient.

14. The method of claim 11, wherein recognizing the target based on the height of the target includes determining a structure of the target based on the height of the target and lateral position information for the target, and wherein determining the structure of the target includes determining whether the structure of the target positioned at the first height value is a first structure based on a lateral position of the target located at a first height value among the height values included in the height set.

15. A radar system for a vehicle, comprising:
a radar sensor providing a plurality of chirp signals; and
a controller generating a two-dimensional (2D) spectrum including a range component and a velocity component based on the plurality of chirp signals provided from the radar sensor radar sensor, generating a range-velocity map corresponding to each height value included in a height set based on the height set, the height set including a velocity of the vehicle and a plurality of height values, determining a correlation coefficient corresponding to each height value included in the height set based on the 2D spectrum and the range-velocity map, and estimating a height of a target based on the correlation coefficient for each height value included in the height set and recognizing the target based on a height of the target.

16. The radar system of claim 15, wherein the controller determines the range-velocity map corresponding to each height value included in the height set based on the height set including the velocity of the vehicle and the plurality of height values and a range set including a plurality of range values.

17. The radar system of claim 15, wherein the controller determines the range-velocity map corresponding to each height value included in the height set based on the height set including the velocity of the vehicle and the plurality of height values and the range component included in the 2D spectrum.

18. The radar system of claim 15, wherein the controller recognizes an environment in which the target is present based on the correlation coefficient for each height value included in the height set, determines the height of the target present in the recognized environment, and recognizes the target based on the height of the target.

19. The radar system of claim 18, wherein the controller compares the correlation coefficient for each height value included in the height set with at least one threshold coefficient value, recognizes an environment which the target is present according to a result of the comparison, determines that a height of the target, which is equal to or larger than the threshold coefficient value, is the height of the target present in the recognized environment and stores the height of the target, compares the determined height of the target with at least one threshold difference value, and recognizes the target according to a result of the comparison.

20. The radar system of claim 19, wherein if there are a plurality of heights of target which are equal to or larger than the threshold coefficient value, the controller determines that a height of target with a highest correlation coefficient among the heights of target equal to or larger than the threshold coefficient value is the height of the target present in the recognized environment.

* * * * *